United States Patent [19]

Lewarchik et al.

[11] Patent Number: 5,484,842
[45] Date of Patent: Jan. 16, 1996

[54] UV-STABLE, WATER-BORNE POLYESTER COMPOSITIONS

[75] Inventors: Ronald J. Lewarchik, Sleepy Hollow; Marc L. Smith, Crystal Lake; Michael R. Sestrick, Woodstock, all of Ill.

[73] Assignee: Morton International, Inc., Chicago, Ill.

[21] Appl. No.: 247,799

[22] Filed: May 23, 1994

Related U.S. Application Data

[63] Continuation-in-part of Ser. No. 124,903, Sep. 21, 1993, abandoned.

[51] Int. Cl.$^6$ .............................. C08J 3/03; C08F 22/00; C08G 63/00
[52] U.S. Cl. ................. 524/608; 524/601; 524/602; 524/604; 524/605; 528/272; 528/302; 525/440; 525/443
[58] Field of Search ..................... 524/601, 602, 524/604, 605, 608; 528/272, 288, 302, 304; 525/165, 519, 440, 443

[56] References Cited

U.S. PATENT DOCUMENTS 4,205,115   5/1980   Piccirilli et al. ................. 528/288
5,245,002   9/1993   Kuo ................................. 524/604

*Primary Examiner*—Tae H. Yoon
*Attorney, Agent, or Firm*—Wayne F. Nacker; Gerald K. White

[57] ABSTRACT

Aqueous dispersions having low VOCs are dispersions or solutions of polyesters. The polyesters useful are formed from A) between about 30 and about 60 mole percent polycarboxylic acids, of which at least about 80 mole percent comprises cyclohexanedicarboxylic acids, B) between about 35 and about 70 mole percent polyols of which at least about 95 mole percent comprises diols, and between about 40 and about 100 mole percent of the polyol content comprising cycloaliphatic diols, and C) between about 5 and about 25 mole percent of a monomer having dihydroxy, monocarboxylic acid functionality. The molar ratio of (B+C)/A is between about 1.01 and about 1.30, whereby the polyester is hydroxyl-terminated having hydroxyl numbers of between about 20 and about 150 and acid numbers between about 30 and about 100. The weight average molecular weight of the polyester is between about 1000 and about 20,000. In aqueous dispersions or solutions, the acid functionality of the polyester is neutralized with base to at least about 40%.

12 Claims, No Drawings

UV-STABLE, WATER-BORNE POLYESTER COMPOSITIONS

This is a continuation-in-part of Ser. No. 08/124,903 filed on Sep. 21, 1993, now abandoned.

The present invention is directed to aqueous dispersions or solutions of polyesters and coating compositions which are UV-stable formed with the dispersions or solutions.

BACKGROUND OF THE INVENTION

As emission standards become ever more strict, there is an increasing need to minimize the volatile organic content (VOC) of coating compositions. There is a continuing need to provide water-borne coating compositions of increasingly lower VOCs. It is an object of the present invention to provide polyester coating compositions of low or very low VOC content, approaching the zero VOC content of powder coatings, and also to provide coating compositions which are UV-stable.

U.S. Pat. No. 3,974,115, the teachings of which are incorporated herein by reference, describes water-borne polyester coating compositions in which the polyester is formed using polycarboxylic acid monomers of which a major portion comprises aromatic dicarboxylic acids. While compositions are described in this patent which are substantially free of VOCs, the coating compositions lack UV-stability.

U.S. Pat. No. 5,262,494 the teachings of which are incorporated herein by reference, describes polyesters in which the acid monomers consist of hexahydrophthalic acids and polyols including 1,4-cyclohexanedimethanol. These polyesters, however, are not water-soluble. U.S. Pat. Nos. 3,668,275 and 2,901,466 also describe polyesters containing cycloaliphatic dicarboxylic acids.

SUMMARY OF THE INVENTION

The invention is directed to compositions comprising partially neutralized acidic functional polyesters dispersed in water as very fine particles. Such compositions form coating compositions which may have low VOCs, i.e., about 1.5 lbs/gal. or below and even as low as about 0.5 lb/gal. or below. The polyesters are formed from A) between about 30 and about 60 mole percent polycarboxylic acids, of which at least about 80 mole percent comprises cyclohexanedicarboxylic acids, B) between about 35 and about 70 mole percent polyols, at least about 95 mole percent of the polyol content comprising diols, and between about 40 and about 100 mole percent of the polyol content comprising cycloaliphatic diols, and C) between about 5 and about 25 mole percent of a monomer having dihydroxy, monocarboxylic acid functionality. The molar ratio of (B+C)/A is between about 1.01 and about 1.30, whereby the polyester is hydroxyl-terminated having hydroxyl numbers of between about 20 and about 150. The polyester has an acid numbers between about 30 and about 100. Preferably, no more than about 5 mole percent of the monomers which form the polyester have aromatic groups. The polyesters have weight average molecular weights ranging from about 100 to about 20,000. The invention is also directed to coating compositions formed from the polyester dispersions.

DETAILED DESCRIPTION OF CERTAIN PREFERRED EMBODIMENTS

Herein, unless otherwise stated, monomer content of polyesters are expressed as mole percent; all other percentages are by weight or by parts (weight) per hundred resin (phr) based upon weight of the polyester. As monomer content of the polyester, the mention of a "polycarboxylic acid" is intended to encompass the corresponding anhydride, as such exist. By "cyclohexanedicarboxylic acids" are meant the 1,2, 1,3 and 1,4 isomers, the anhydride of the 1,2 isomer (hexahydrophthalic anhydride), and ring-alkylated derivatives of each, e.g., derivatives in which one or more alkyl group(s) of up to about seven carbon atoms is bound to the cycloaliphatic ring.

Of the polycarboxylic acid content, at least about 80 mole percent comprises cyclohexanedicarboxylic acids, preferably at least about 90 mole percent and most preferably at least about 100 mole percent. The balance of the carboxylic acid content, if any, is preferably substantially all dicarboxylic acids and preferably substantially all aliphatic dicarboxylic acids. Carboxylic acids of functionality greater than 2 may be used to a minor extent if branching is desired, but generally linear polyester chains are preferred. The polyester may also contain some aromatic polycarboxylic content, but aromatic polycarboxylic acids are considered to be undesirable as they tend to detract from UV-stability.

Examples of aliphatic acids which may be included include succinic acid, glutaric acid, adipic acid, pimelic acid, suberic acid, azelaic acid, sebacic acid, diglycolic acid, 1,12-dodecanoic acid, tetrapropenyl succinic acid, maleic acid, fumaric acid, itaconic acid, malic acid, etc. Examples of aromatic dicarboxylic acids are phthalic acid, isophthalic acid, terephthalic acid, benzophenone dicarboxylic acid, diphenic acid, 4,4'dicarboxydiphenyl ether, 2,5-pyridine dicarboxylic acid, trimellitic acid, etc. Preferably at least about 95 mole percent and most preferably about 100% of the dicarboxylic acid content is cycloaliphatic or aliphatic.

Between about 40 and about 100 mole percent of the polyol content of the polyester comprises cycloaliphatic diols, such as 1,4-cyclohexanediol, 1,4-cyclohexanedimethanol, hydrogenated bisphenol A, 1,2-cyclopentanediol, 1,3-cyclopentanediol, 1,2, 1,3, 1,4, and 1,5-cyclooctanediol.

Of the remaining about 0 to about 60 mole percent of the polyol content, the major portion comprises diols, although up to about 15 mole percent may be higher number diols. Polyols having more than two hydroxy groups may be used to provide branching which imparts increased chemical resistance, durability and stain resistance, depending on the relative amounts used, but at the expense of flexibility and solution viscosity. Preferably, the content of polyols having hydroxyl functionality greater than two, e.g., three or four, is no greater than about 5 mole percent of polyol content B), but may be advantageously employed at amounts greater than about 0.5 mole percent. Again, it is preferred that all or substantially all, i.e., at least about 95 mole percent and most preferably 100%, of the total diol content be aliphatic or cycloaliphatic. While the polyester may contain a minor amount of aromatic polyol content, aromatic polyols, like aromatic polycarboxylic acids, detract from UV-stability. Suitable non-cyclic polyols include, for example, 1,6 hexanediol, pentaerythritol, trimethylolpropane, 2-methyl-1,3-propanediol, neopentyl glycol, 2-butyl-2-ethyl-1,3-propanediol, ethylene glycol, 1,4-butanediol, 1,3-butanediol, 1,5-pentanediol and trimethylol ethane.

Monomer component C) is an aliphatic monomer which has hydroxyl functionality of 2 and carboxylic functionality of 1. Monomer C) functions in polyester formation as a diol, reacting with polycarboxylic acids. Monomer C) is selected which has a carboxylic acid group considerably less reactive than the carboxylic moieties of the polycarboxylic acids and polyester formation conditions are selected whereby relatively little of the carboxylic acid moiety of C) reacts, whereby component C) provides pendent carboxylic acid functionality to the polyester. The preferred (and most commercially available) monomer C) is dimethylol propionic acid.

Polyesters according to this invention are substantially linear, having hydroxyl numbers of from about 20 to about 150, preferably from about 30 to about 100 and acid numbers from about 30 to about 100, preferably between about 40 and about 60. The polyester is produced by any of the conventional processes. To prevent the carboxylic acid functionality of the C) monomer from reacting during polyester synthesis, it is preferred that the polyester be formed at a temperature no higher than about 200° C. The use of a catalyst is preferred, as is the passage of an inert gas through the reaction mixture to protect against discoloration and to aid in the liberation of water from the mixture as it is produced by the condensation. The esterification takes place almost quantitatively and may be monitored by determining the acid and/or hydroxyl numbers or by monitoring the viscosity of the product.

U.S. Pat. No. 4,205,115 describes polyester coating compositions using polyesters of weight average molecular weights ranging from 50,000 to 300,000. This patent suggests that the polyesters might be partially neutralized and dispersed in water. In the only example of an aqueous dispersion in this patent, i.e., Example 7, the aqueous dispersion contained a rather significant amount, i.e., 46 wt. % based upon weight of the resin, of organic solvent. Calculated as VOC, this would be about 3 lbs/gal. Indeed, in the molecular weight range taught in U.S. Pat. No. 4,205,115, it is believed that a significant amount of organic solvent is required to produce a stable aqueous dispersion.

Generally, there are two different techniques which can be used to form dispersions of acid-functional polyester resins, direct thinning and reverse thinning. In direct thinning, water is added to a molten resin/neutralizing amine blend (or molten resin by itself if the base is to be added with the water). As water boils at 100° C., if the resin or resin/amine combination is a solid or an un-stirable liquid at temperatures at much above 150° C., the water cannot be added successfully. Small amounts of water can be added to a molten polyester which is heated to greater than 100° C.; however, sever forming results unless the resin is quickly cooled to below 100° C. The chilling effect of adding the water tends to cause polyesters to solidify.

Reverse thinning differs from direct thinning in that the hot resin is poured slowly into water. The water inherently cannot be more than 100° C. during the addition. Hot molten polyester resins have a tendency to solidify before they form a dispersion when they are poured into water, even when that water is at its maximum temperature.

The tendency of polyesters to solidify increases with molecular weight of the polyester. Accordingly, high-molecular weight polyesters, such as those taught in U.S. Pat. No. 4,202,115, would be almost impossible to disperse in water without the aid of substantial amounts of coupling solvents to increase the compatibility of the polyester with water. Coupling solvents, of course, increase the VOC of the composition.

In contrast, the weight average molecular weight (Mw) of the polyesters of the present invention are below about 20,000 and preferably below about 16,000. Even at these molecular weights, dispersions without coupling solvents can be produced, though not with particular ease. At even lower molecular weights, dispersion is easier, and polyesters having weight average molecular weights as low as 1000 may be used. However, it is found that certain performance characteristics are better with higher molecular weight polyesters. Accordingly, it is preferred that the weight average molecular weight be at least 5000, most preferably at least about 10,000. Depending upon VOC requirements, some organic solvent may be added to enhance dispersibility and for other purposes, such as film forming. Preferably, no more than about 10 wt % solvent is added based upon the weight of the polyester, more preferably no more than about 5 wt % and, if the solvent is needed for no other purpose, it is preferred that no organic solvent be added. Accordingly, compositions having VOCs below about 1.5 lb./gal, preferably below about 0.5 lb/gal may be readily achieved. Even if no coupling solvent is added, the composition may have some VOC if the neutralizing base, e.g., amine, is considered a volatile organic. (Herein the term "solvent" is used exclusive of the base used to neutralize the acid functionality of the polyester.)

To form an aqueous emulsion or an aqueous solution of the polymer, at least partial neutralization with base is required. (The term "solution" is used somewhat loosely herein with respect to the polyester. Aqueous dispersions of the polyester have vary small polyester particle size; accordingly, dilute compositions may appear clear, like a solution, while actually being a dispersion.) The base may be ammonium hydroxide or a water-soluble organic amine, such as dimethylethanolamine (DMEA), diethylethanolamine, trimethylamine, diethanolamine, triisopropanolamine, diisopropanolamine, monoisopropanolamine, N-methylmorpholine, triethylamine, morpholine, pyridine. The level of neutralization needed to achieve an emulsion or solution will depend upon the particular polyester, particularly upon the acid number. Typically, about 40% neutralization will achieve a stable emulsion and about 70% neutralization will fully solubilize the polyester.

To prepare a solution without encountering viscosity problems, it is found convenient to initially form an emulsion by first neutralizing to a lower level in a smaller amount of water and subsequently adding additional water and base. To initially form the emulsion, a minor amount of surfactant may be added. The surfactant is not necessary, but, particularly if surfactant is desired in the final coating formulation, it is convenient to use the surfactant to aid in the initial emulsification. An emulsion of the polymer may be formed in which the polyester is up to 65 percent by weight. A solution of the polymer may be formed in which the polyester is up to 50 percent by weight.

The polyesters, having hydroxyl groups, are curable through the hydroxyl groups, preferably with aminoplasts, which are oligomers that are the reaction products of aldehydes, particularly formaldehyde, with amino- or amido-group-carrying substances exemplified by melamine, urea, dicyandiamide, and benzoguanamine. Hydroxyl cross-linking agents are also described, for example in U.S. Pat. No. 2,940,944 and German patent applications 1,060,596, 1,083, 548 and 1,089,549. Especially advantageous are the aminoplasts, which are modified with alkanols having from one to four carbon atoms. It is preferable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used for combining with the linear polyesters of this invention. Particularly preferred are the amino cross-linking agents sold by American Cyanamid under the trademark Cymel. In particular, the Cymel 301, Cymel 303, and Cymel 385 alkylated melamine-formaldehyde resins are useful. Of course, it is possible to use mixtures of all of the above N-methylol products. Preferably, the cross-linking agent is sufficient to substantially completely react with all of the hydroxyl functionality of the polyester, and cross-inking agent's having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 10 and about 70 phr.

The polyesters of the present invention have substantial acid functionality, due to monomer component C). Although the acid functionality is provided so as to afford water dispersibility/solubility, it is also possible to cross-link the polyester through cross-linking agents reactive with carboxylic acid groups, e.g., isocyanates, blocked isocyanates, hydroxyalkylamides. Acid group-reactive cross-linking agents may be used alone or in conjunction with hydroxyl-functional cross-linking agents. Many cross-linking agents have at least some reactivity with both hydroxyl groups and carboxylic acid groups.

In addition to the binder and cross-linking agent, a coating composition may contain up to about 50–60 wt. percent pigments and fillers, although for clear coatings no pigment or filler may be included. Other additives known in the art, such as flow modifiers, viscosity modifiers and other binders may be dispersed in the coating composition. A catalytic amount of a strong acid such as p-toluenesulfonic acid may be added to the composition just before it is applied to a substrate to hasten the cross-linking reaction.

The composition thus obtained may be applied to sheet metal such as is used for automobile and airplane bodies; architectural metal skins, e.g., siding and window frames; and the like by spraying, dipping, or brushing but is particularly suited for a coil coating operation wherein the composition is wiped onto the sheet as it unwinds from a coil and then baked as the sheet travels toward an uptake coil winder. It is also contemplated for use in the so-called "plate coater", available from Alcan Aluminum, whereby the composition is extruded as a thin coating onto the sheet metal and then smoothed by a doctor blade. The baking temperature in any event may be from about 100° C. to about 300° C.

Coatings employing the polyester of the present invention have a high degree of elasticity and a high degree of hardness, as well as high gloss and resistance to weathering.

The invention will now be described in greater detail by way of specific example.

EXAMPLE 1

A polyester was prepared from the following components:

| Polymer "A" Cycloaliphatic Polyester | | |
|---|---|---|
| Ingredient | grams | moles |
| neopentyl glycol | 261.2 | 2.51 |
| cyclohexanedimethanol, 90% | 631.9 | 3.95 |
| trimethylolethane[1] | 10.6 | 0.09 |
| hexahydrophthalic anhydride[2] | 477.5 | 3.10 |
| phthalic anhydride | 43.6 | 0.29 |
| dimethylolpropionic acid | 240.3 | 1.79 |
| butyl stannoic acid | 2.0 | — |
| 1,4-cyclohexanedicarboxylic acid | 582.9 | 3.39 |

[1]2-methyl-2-hydroxymethyl-1,3-propanediol
[2]-hexahydro-1,3-isobenzofurandione The neopentyl glycol, cyclohexanedimethanol, 90%, trimethylolethane, hexahydrophthalic anhydride, phthalic anhydride, 1,4-cyclohexanedicarboxylic acid, dimethylolpropionic acid and butyl stannoic acid were charged to a three liter resin reaction flask equipped with an agitator, packed column, condenser, thermometer and inert gas inlet. The reactor was flushed with inert gas and the reactants heated to 195°–197° C. while removing water. The reaction was continued for about three hours until the acid value was 51.3 and the viscosity, at 70% solids in methyl amyl ketone, was X-Y.

A dispersion was prepared having the following formulation (in grams):

| Dispersion "B" | |
|---|---|
| Polymer "A" | 1,074.6 |
| ammonia, 28% | 0.5 |
| dimethylethanolamine (DMEA) | 36.4 |
| Surfynol 104[1] | 5.4 |
| deionized water | 846.7 |

[1]2,4,7,9-tetramethyl-5-decyn-4,7-diol 1,074.6 grams of Polymer "A" were heated to 100° C. in a resin reaction flask described above. The ammonia, dimethylethanolamine, and 100 grams of deionized water were added and mixed for 15 minutes. At 94° C., the Surfynol 104 and 100 grams of deionized water were added and mixed for 10 minutes. The remaining water was added slowly over 24 minutes while the temperature was adjusted to 79° C. The resulting dispersion was white, viscosity of 80 cps, solids 55.8% and pH of 6.95.

A dispersion was prepared having the following formulation (in grams):

| Solution "C" | |
|---|---|
| Dispersion "B" | 150.0 |
| DMEA | 2.2 |
| deionized water | 57.1 |

The DMEA and deionized water were premixed and added to 150.0 grams of Dispersion "B" and mixed. The dispersion became clear, had solids of 40.6%, viscosity of 260 cps and pH of 7.9.

Coatings were made by first dispersing 354.8 grams of titanium dioxide, and 45.03 grams of aluminum silicate in 1548.5 grams of Solution "C", 50.0 grams deionized water, 25.0 grams Cymel 303 2.7 grams of a defoamer and 5.7 grams of a polyether surfactant until a Hegman reading of 7 was obtained. Subsequently, 412.4 grams of Solution "C", 43.4 grams deionized water, 74.4 grams of Cymel 303 and 2.2 grams of BYK-301 were added and mixed.

The coating composition thus prepared had solids content of 63% and VOC content of only 0.3 lbs./gallon. The composition was further reduced 12:1 (12 parts paint, 1 part water) with deionized water, was spray applied to steel panels and baked 15 minutes at 350° F. (177° C.) to yield films of 1.0–1.3 mils. The films were hard, glossy and after 300 hours exposure in a QUV cabinet, retained 96% of their original gloss compared to 85% and 24% for two controls.

EXAMPLE 2

A polyester was prepared in the manner of the polyester prepared in Example 1 having the formulation (percents by weight):

| | |
|---|---|
| Neopentyl glycol | 12.97 |
| Cyclohexane dimethanol | 31.37 |
| Hexahydrophthalic acid | 23.71 |
| Trimethylolethane | 0.53 |
| 1,4-cyclohexane dicarboxylic acid | 28.94 |
| Dimethylol propionic acid | 11.93 |
| Phthalic anhydride | 2.17 |
| Fascat 4100 (butyl stenoic acid) (catalyst) | 0.10 |

What is claimed is:

1. An aqueous dispersion or solution of a polyester,
said polyester formed of monomers comprising
  A) between about 30 and about 60 mole percent polycarboxylic acids, at least about 80 mole percent of said carboxylic acids comprising cyclohexanedicarboxylic acids,
  B) between about 35 and about 70 mole percent polyols, at least about 95 mole percent of the polyol comprising diols, and between about 40 and about 100 mole percent of the polyol content comprising cycloaliphatic diols, and
  C) between about 5 and about 25 mole percent of dimethylol propionic acid;
the molar ratio of (B+C)/A being between about 1.01 and about 1.30, whereby the polyester is hydroxyl-terminated,
said polyester having a hydroxyl number between about 20 and about 150, and
said polyester having an acid number between about 30 and about 100,
said polyester having a weight average molecular weight of between about 1000 and about 20,000, and
said polyester having its acidic moieties neutralized to at least about 40% with base,
said dispersion or solution containing no more than about 10 wt % organic solvent relative to the weight of said polyester.

2. An aqueous dispersion or solution in accordance with claim 1 wherein said polyols used to form said polyester comprise between about 0.5 and about 5 mole percent of polyols having hydroxyl functionality greater than 2.

3. An aqueous dispersion or solution in accordance with claim 1 wherein said polycarboxylic acids used to form said polyester comprise about 90% or greater cyclohexanedicarboxylic acids.

4. An aqueous dispersion or solution in accordance with claim 1 wherein said polycarboxylic acids used to form said polyester comprise about 100% cyclohexanedicarboxylic acids.

5. An aqueous dispersion or solution in accordance with claim 1 wherein no more than about 5 mole percent of said monomers used to form said polyester have aromatic moieties.

6. An aqueous dispersion or solution in accordance with claim 1 wherein said polyester has a weight average molecular weight of about 5000 or above.

7. An aqueous dispersion or solution in accordance with claim 1 wherein said polyester has a weight average molecular weight of about 10,000 or above.

8. An aqueous dispersion or solution in accordance with claim 1 wherein said polyester has a weight average molecular weight of about 16,000 or below.

9. An aqueous dispersion or solution in accordance with claim 1 containing no more than about 5 wt % organic solvent relative to the weight of said polyester.

10. An aqueous dispersion or solution in accordance with claim 1 containing no organic solvent.

11. A coating composition comprising an dispersion or solution of said polyester in accordance with claim 1 in combination with a cross-linking agent reactive with said polyester.

12. A coating composition in accordance with claim 10 wherein said cross-linking agent is an aminoplast.

* * * * *